Nov. 4, 1924.
R. O. KEEVER
1,514,290
GRASS CATCHER FOR LAWN MOWERS
Filed May 8, 1922
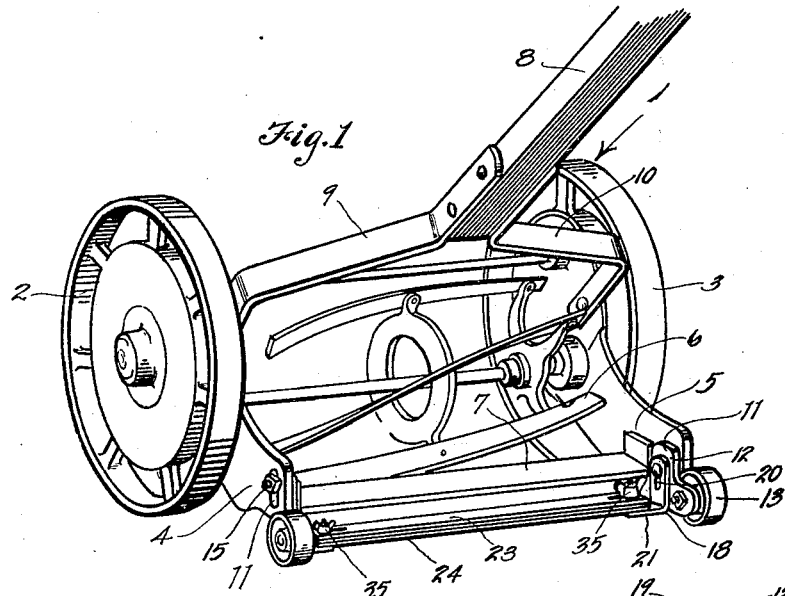
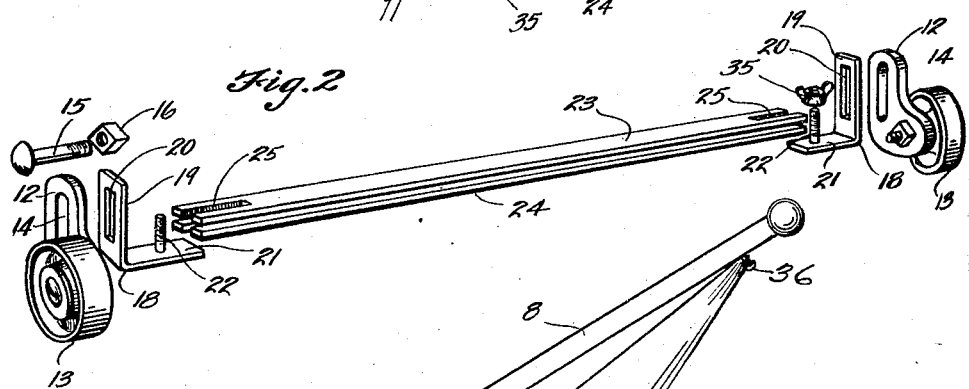
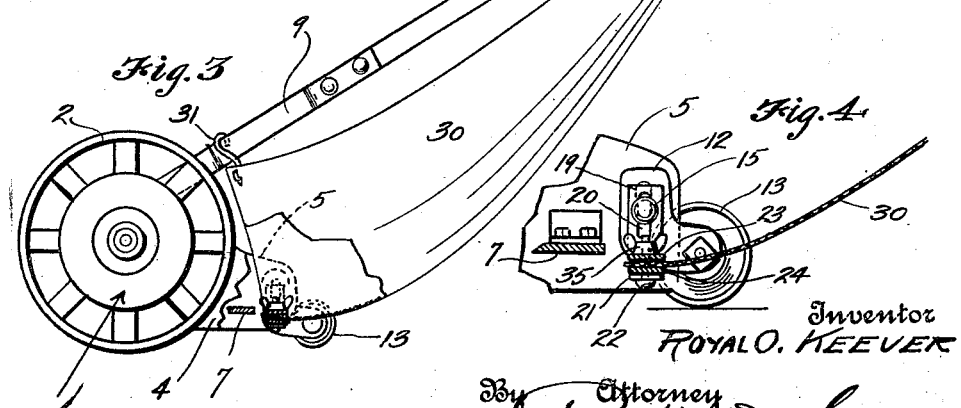
Inventor
ROYAL O. KEEVER
By Attorney
Richard J. Cook Patented Nov. 4, 1924.

1,514,290

UNITED STATES PATENT OFFICE.

ROYAL O. KEEVER, OF TACOMA, WASHINGTON.

GRASS CATCHER FOR LAWN MOWERS.

Application filed May 8, 1922. Serial No. 559,209.

*To all whom it may concern:*

Be it known that I, ROYAL O. KEEVER, a citizen of the United States, and a resident of Tacoma, Pierce County, Washington, have invented certain new and useful Improvements in Grass Catchers for Lawn Mowers, of which the following is a specification.

This invention relates to improvements in lawn mowers; and more particularly to an adjustable grass catcher attachment for lawn mowers of the common types of construction.

Explanatory to this invention, it will be stated that in nearly all lawn mowers, there is a roller mounted transversely of the cutter frame just back of the cutter blade, which is adjustably fixed at its ends to the frame and acts as a means for regulating the height of the cutter blade from the ground, and that the ordinary types of grass catchers are attached to the mower frame so as to drag on the ground back of this roller. This construction is not altogether satisfactory for several reasons, one being that there is usually a loss of grass between the roller and the catcher; another, the weight of the grass cut has to be drawn along by the machine.

In view of these and other disadvantages, it has been the object of this invention to provide a grass catcher attachment wherein the usual cross roller as stated above, is eliminated and the mower is supported by individual rollers at each end of the frame, and in place of the adjusting roller, is a cross bar whereto the lower end of a grass catcher bag is attached so that this end is held closely to the cutter and loss of grass prevented while the other end of the bag is supported from the handle so that the bag does not drag the ground and operation is made easier and faster.

Other objects of the invention reside in the details of construction whereby the parts may be adjusted to adapt them to mowers of different size.

In accomplishing these and other objects of the invention, I have provided the improved details of construction, the preferred forms of which are illustrated in the accompanying drawings, wherein—

Figure 1 is a perspective view of a lawn mower to which adjusting rollers and grass catcher parts, embodied by the present invention, have been attached.

Figure 2 is an enlarged, perspective view of the parts embodied by the present invention, shown in disconnected relation.

Figure 3 is a side view of a lawn mower equipped with a grass catcher and parts associated therewith, according to the present invention.

Figure 4 is a detail view illustrating the manner of securing the end of the grass catcher bag between the parts of the cross bar.

Referring more in detail to the drawings—

1 designates, as a whole, a lawn mower of a common type and to which parts embodied by the present invention have been attached. The mower comprises the two supporting and cutter driving wheels 2 and 3, a frame structure, to which the wheels are attached, comprising opposite, rearwardly extending side portions 4 and 5, a rotating cutter 6, which operates against a fixed cutter blade 7 extended between the frame parts 4 and 5, and has a handle 8 attached by laterally and forwardly extending bars 9 and 10 to the frame at opposite sides.

The frame parts 4 and 5, at opposite ends of the mower, are each provided, at their rearward ends, with vertical slots 11, and fitting against the inner faces of these parts are plates 12 to which rollers 13 are pivotally attached. These plates are provided with vertical slots 14 which register with the frame part slots, and bolts 15 are extended therethrough with nuts 16 tightened thereon to hold the rollers at adjusted positions whereby the distance of the blade 7 from the ground is regulated.

The use of such rollers eliminates the use of the usual cross roller and provides that the grass catcher, presently described, can be located closely adjacent the cutter blade 7. It is apparent that, if desired, the present rollers may be mounted inside or outside of the frame and still serve in the same capacity.

Fitted against the inner faces of the roller supporting plates 12 are brackets 18, having flat vertical portions 19 provided with slots 20 for receiving the bolts 15 therethrough whereby the brackets may be fixed, in vertically adjusted positions with respect to the frame. Each bracket also has a laterally extending arm 21, and through these are extended bolts 22 whereby the opposite ends of cross bars 23 and 24 may be fixed to the brackets; the cross bars being arranged one upon the other and provided at their ends with slots 25 for receiving the bolts 22 and which provides for adjustment of the parts when used on machines of different width.

The grass catcher proper consists of a bag 30, the lower, central portion of which is disposed between the cross bars 23 and 24, with its adjacent corners fixed by hooks, as at 31, to the handle attaching bars 9 and 10. The bag is tapered in such a manner that its rearward edges converge and are supported by hook 36 attached to the handle, as shown in Figure 3, and is thereby held free of the ground. The bars 23 and 24, are tightened against the intermediate bag end, by means of wing nuts 35 applied to the bolts 22, and is thereby held directly back of and below the cutter blade 7.

It is readily seen that the construction permits adjustment to machines of different size, provides for adjusting the length at which grass is cut, avoids loss of cut grass, and makes operation easier by avoiding the dragging of the carrier on the ground. Parts so constructed can be easily applied to all ordinary types of mowers, at a relatively small cost, and will satisfactorily serve the purposes for which they are intended.

Having thus described my invention, what I claim as new therein and desire to secure by Letters-Patent, is:

In a lawn mower of the character described, comprising a frame having rearwardly extending portions at its opposite sides, a cutter blade mounted transversely of the frame between said rearwardly extended portions, a pair of brackets fixed for vertical adjustment at opposite sides of the frame back of said blades, a roller supported by each of said brackets, paired cross bars adjustably fixed at their opposite ends to the brackets, a grass catching bag having its lower end disposed between the cross bars and its upper end supported by the handle; the said lower end being continuous to said cutter blade and forward of said rollers, and means for clamping the bars against the bag for the purpose set forth.

Signed at Seattle, Washington, this 28th day of April, 1922.

ROY O. KEEVER.